United States Patent [19]

Van Buskirk et al.

[11] Patent Number: 5,229,450
[45] Date of Patent: Jul. 20, 1993

[54] TEMPORARY PROTECTIVE COATING COMPOSITIONS

[75] Inventors: Ellor J. Van Buskirk; Rudolf Maska, both of Pittsburgh, Pa.

[73] Assignee: PPG Industries, Inc., Pittsburgh, Pa.

[21] Appl. No.: 747,465

[22] Filed: Aug. 13, 1991

Related U.S. Application Data

[60] Continuation of Ser. No. 574,717, Aug. 30, 1990, abandoned, which is a continuation-in-part of Ser. No. 481,267, Feb. 20, 1990, abandoned, which is a division of Ser. No. 415,509, Oct. 2, 1989, Pat. No. 5,081,174, which is a continuation-in-part of Ser. No. 255,286, Oct. 11, 1988, Pat. No. 4,942,193.

[51] Int. Cl.$^5$ ............... C08L 91/08; C08L 33/02
[52] U.S. Cl. .................. 524/487; 428/461; 524/556
[58] Field of Search ............ 524/487; 428/461

[56] References Cited

U.S. PATENT DOCUMENTS

| | | | |
|---|---|---|---|
| 4,013,607 | 3/1977 | Dwyer et al. | 260/29.6 H |
| 4,168,255 | 9/1979 | Lewis et al. | 524/277 |
| 4,289,671 | 9/1981 | Hernandez | 260/28.5 AV |
| 4,317,755 | 3/1982 | Gregory | 524/276 |
| 4,390,436 | 6/1983 | Hernandez | 252/49.3 |
| 4,540,736 | 9/1985 | Herten et al. | 524/556 |
| 4,562,226 | 12/1985 | Coombes et al. | 524/767 |
| 4,562,226 | 12/1985 | Coombes et al. | 524/767 |
| 4,693,909 | 9/1987 | Ziegler et al. | 427/156 |
| 4,826,902 | 5/1989 | Hanabata et al. | 524/524 |
| 4,942,193 | 7/1990 | Van Buskirk et al. | 524/276 |

FOREIGN PATENT DOCUMENTS 0201702 11/1986 European Pat. Off.

Primary Examiner—Joseph L. Schofer
Assistant Examiner—Wu C. Cheng
Attorney, Agent, or Firm—Dennis G. Millman

[57] ABSTRACT

A formable, weldable, temporary protective coating for use on metals, said coating comprising a base-neutralized acid or base-functional copolymer.

8 Claims, 2 Drawing Sheets

TEMPORARY PROTECTIVE COATING COMPOSITIONS

This application is a continuation of application Ser. No. 07/574,717, filed Aug. 30, 1990, now abandoned, which is a continuation in part of application Ser. No. 07/481,267, filed Feb. 20, 1990, now abandoned which was a division of application Ser. No. 07/415,509 filed Oct. 2, 1989, now U.S. Pat. No. 5,081,174 which was a continuation in part of application Ser. No. 07/255,286 filed Oct. 11, 1988, now U.S. Pat. No. 4,942,193.

BACKGROUND OF THE INVENTION

The present invention relates to temporary protective coating compositions which are useful in passivating untreated metallic substrates. More specifically, the invention relates to formable, weldable aqueous temporary protective coatings.

BRIEF DESCRIPTION OF THE PRIOR ART

Passivation of metallic substrates in mills is done, in the main, with mill oils or chemical treatments, in order to prevent or reduce corrosion, particularly white rust. Usually passivating agents are removed after the metallic substrates are formed into a part. Mill oils are difficult to remove and less than desired corrosion protection is provided thereby. Chemical treatments, particularly those involving film-forming materials, are usually incompatible with other materials and processes that are subsequently applied to the subject metallic substrates.

Art-related protective coating compositions comprising alkali-soluble carboxyl group-containing polymers and/or waxes are known in the art. However, most of these compositions are employed distinctly on painted or polished surfaces and are less effective on untreated metallic substrates. In contrast, the protective coating compositions which are of interest here should be suited to the application to untreated metallic substrates. Additionally, these protective coating compositions should be compatible with the subsequently applied materials and processes. Moreover, the passivated metallic substrates should be formable and weldable and cleanable with an aqueous alkaline solution, and should be corrosion resistant. These types of temporary protective coating compositions are hereby provided.

SUMMARY OF THE INVENTION

In accordance with the foregoing, the present invention encompasses: a formable, weldable aqueous temporary protective coating composition for a metallic substrate, said composition comprises a combination of a neutralized acid- or base-functional polymer and a lubricating composition in an amount sufficient to provide drawability and formability, of the metallic substrate to which it was applied. The coating composition of this invention is characterized in that the polymer has a calculated glass transition temperature (Tg) of about $-30°$ C. to $45°$ C. and further characterized in that the coating weight in milligrams per square inch equals or is less than $(Tg \times -0.0253) + 3.26$. Coating weight in milligrams per square inch is alternately referred to by the term film weight or film thickness; Tg is in degrees centigrade (°C.).

In the present embodiment of the invention, there is employed a base-neutralized acid-functional polymer. The acid-functional polymer is prepared by solution polymerization of ethylenically unsaturated monomer(s), at least one of which is acid functional; preferably, the polymerization is in the presence of a lubricating composition such as a hydrocarbon wax. The resultant product is dispersed in water in the presence of a base such as ammonium hydroxide.

When applied as a passivating agent, the protective coating composition, in the preferred embodiment, is found to produce a coating which is corrosion resistant, drawable, formable, weldable, and easily removable with an aqueous alkaline or acidic solution.

The term "formable" or "formability" is defined as the ability of a coated sheet of metal to be bent without creating substantial cracks or voids in the film. The term "drawable" or "drawability" is defined as the ability to stamp a coated sheet of metal into a curved three-dimensional shape without substantially breaking the sheet and without causing significant damage to the coated sheet of metal. The term "weldable" or "weldability" is defined as the ability to perform a sequence of spot weld on a coated sheet of metal using a conventional spot welding tip and pressure without substantial attendant problems of no welds, charring or cracking. As would be realized, the above properties can be affected by the nature of the selected sheet(panel) of metal. At any rate, the protective coating composition of this invention shows remarkable improvement in the aforestated properties.

DETAILED DESCRIPTION OF THE INVENTION

Figure 1:
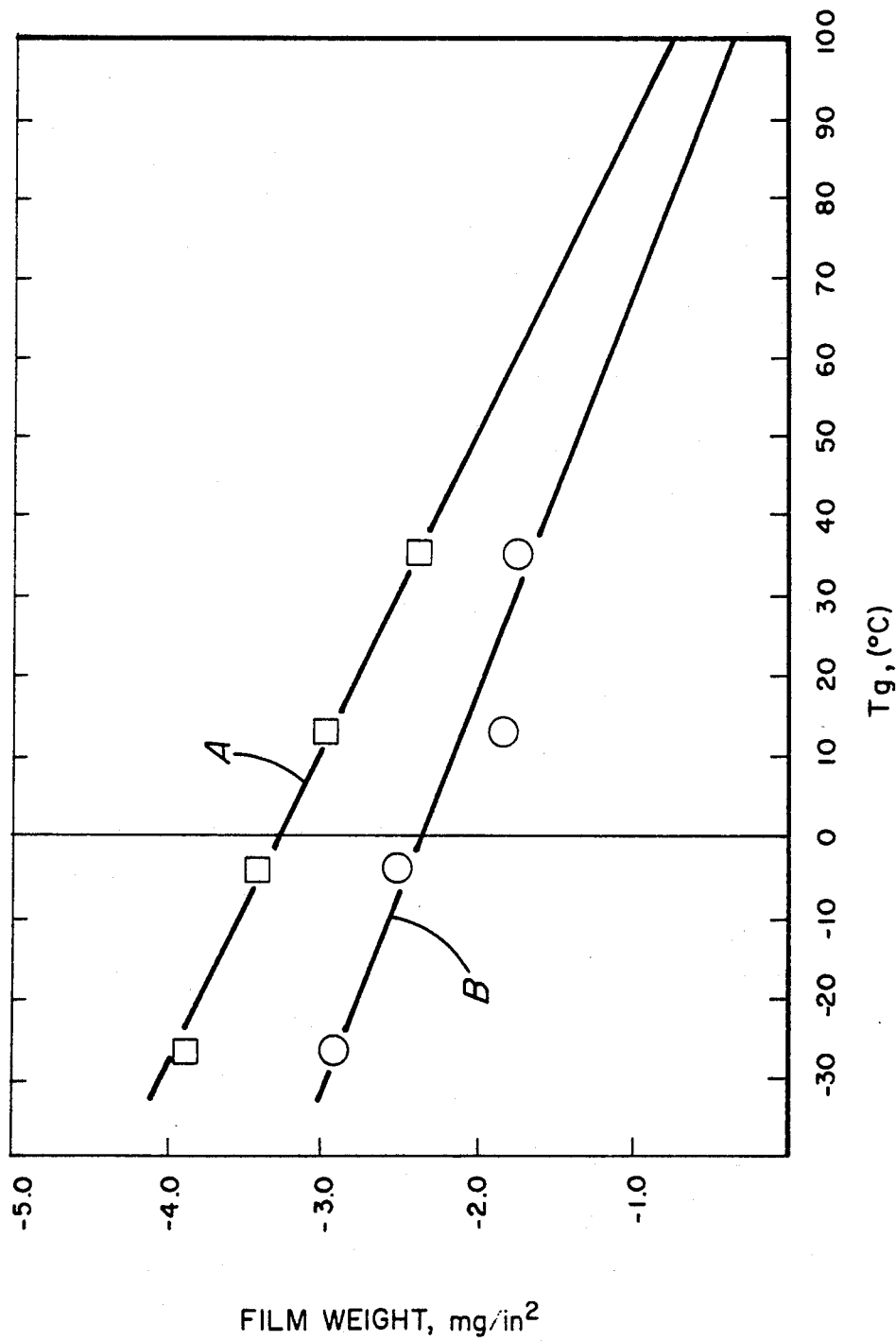
FIG. 1 graphically represents data from Table VI on weldability of the coatings of this invention with respect to Tg (°C.) of the coatings relative to coating weights (milligrams per square inch) on a galvaneal substrate. Line "A" of FIG. 1 represents marginally acceptable weldability of the coatings, and line "B" of FIG. 1 represents typically acceptable weldability of the coatings.
Figure 2:
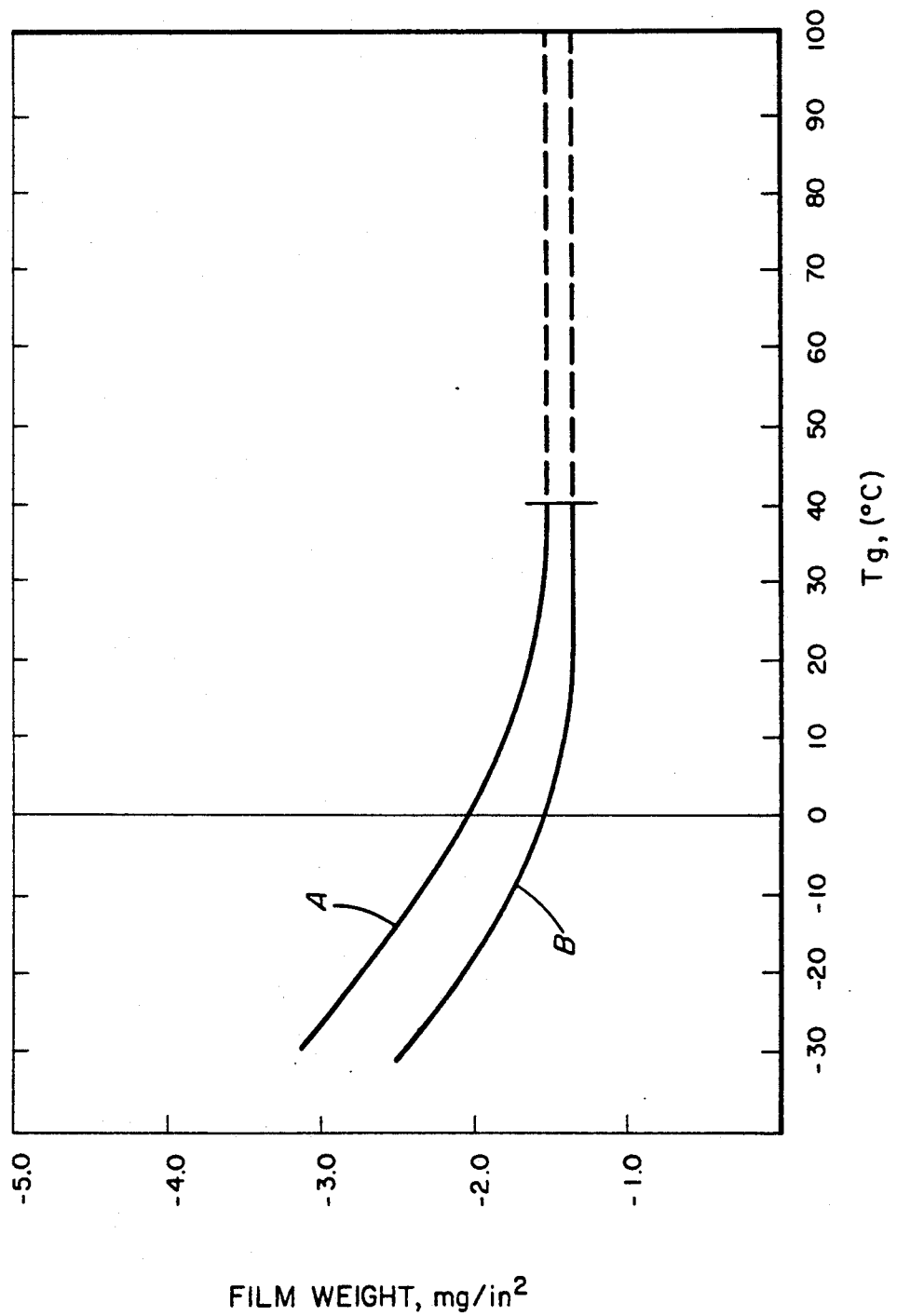
FIG. 2 graphically represents data from Table VII on weldability of the coatings of this invention with respect to Tg (°C.) of the coatings relative to coating weight (milligrams per square inch) on galvanized steel. Curve A of FIG. 2 represents marginally acceptable weldability of the coatings, and curve B of FIG. 2 represents typically acceptable weldability of the coatings.

The aqueous temporary protective coating composition of this invention, in the preferred embodiment, is characterized as being drawable, formable, weldable, and easily removable with an aqueous alkaline solution. These and other aspects of the claimed protective coating composition are described more fully below.

The acid- or base-neutralized, functional polymer that is employed herein has a Tg of about $-30°$ C. to $100°$ C. Typically, the Tg is about $-30°$ to $45°$ C. and preferably about $-15°$ C. to $30°$ C. Weight average molecular weight of the polymer can be about 3,000 to 90,000 and preferably about 5,000 to 30,000. Typically, the polymer is a solution polymerized free-radical addition polymer. The polymer can be acid or base functional. In accordance with this invention, the acid-functional polymer can be prepared by addition polymerizing in a solvent medium, ethylenically unsaturated monomer(s) at least one of which is an acid-functional monomer. Examples of the acid-functional monomers can be acrylic acid, methacrylic acid, crotonic acid, itaconic acid, maleic acid, and the like. An amount of about 5 to 100 percent by weight of the acid-functional monomer based on the total monomer content can be employed. Typically, an amount of about 10 to 40 and preferably about 10 to 30 percent by weight is employed. A copolymerizable ethylenically unsaturated monomer such as a vinyl monomer, e.g., styrene, vinyl toluene and the like, esters of acrylic or methacrylic acid, such as methyl methacrylate, butyl acrylate, and 2-ethylhexylacrylate, can be employed.

The base-functional polymer can be prepared by polymerizing, in a solvent medium, ethylenically unsaturated monomers, at least one of which is a base-functional monomer. Examples of the base-functional monomers can be amino alkyl(meth)acrylate, t-butyl aminoethyl(meth)acrylate, diisobutylaminoethyl(meth)acrylate, and dimethyl aminoethyl(meth)acrylate. An amount of about 1 to 50 and preferably about 5 to 20 of the base-functional monomers can be employed.

The lubricant composition useful herein is believed to impart the property of drawability to the protective coating compositions. Hence, the lubricating composition is employed in an amount sufficient to provide drawability of a substrate having thereon the coating of this invention. The lubricating composition can contain a wax and in the present embodiment of the invention, the lubricating composition consists essentially of a wax. The wax has a melting point of about 140° F. Suitable waxes include hydrocarbon waxes of varying melting points and grades, e.g., bees wax, carnauba wax, petrolatum wax and a mixture thereof. The lubricating composition can be employed in an amount ranging from about 5 to 70 and preferably 10 to 30 percent by weight, based on the total weight of the lubricating composition, and the polymer. The lubricating composition may contain a silicone fluid, molybdenum disulfide, graphite, a hydrocarbon oil, a vegetable oil, a fatty acid, and a resinous adjunct. In the preferred embodiment wherein the polymer is prepared in the presence of the lubricating composition such as a wax, it is believed, without being bound thereby, that a partial graft of the polymer and the lubricating composition can be formed. It should, however, be realized that a polymer can be made in the absence of a lubricating composition and then employed in combination with a lubricating composition, preferably in the form of a powder or liquid.

In a particularly preferred embodiment of the invention, graphite, or an equivalent thereof, is employed as an additive that enhances conductivity of the applied protective coating composition during welding. The additive is usually employed in a particulate form, in an amount sufficient to effect welding of a film of the composition which is of a relatively higher coating weight of about 1.5 milligrams per square inch or higher.

The protective coating composition can be prepared by thinning the acid-neutralized or base-neutralized solution polymer containing a lubricating composition in water to a conducive application viscosity. This can be done by at least partially neutralizing the functional polymer, preferably with a volatile neutralizing agent. By the term "volatile", it is meant that the neutralizing agent leaves the applied coating when it is dried or baked. Neutralization can be conducted before or during the thinning. For an acid-functional polymer, neutralization is effected with a base. Illustrative examples of the bases can be ammonia, including ammonium hydroxide, and amines, e.g., ethanolamine, diethanolamine, N-methylethanolamine, dimethylethanolamine, methylamine, ethylamine, triethylamine and morpholine. For a base-functional polymer, neutralization can be effected with an organic or inorganic acid such as acetic acid, formic acid, lactic acid, sulfamic acid or the like.

Other additives, such as a defoamer, a wetting agent, or a solvent, may be employed herein. It is, however, a distinct feature of this invention that the protective coating compositions can be free of or substantially free of an external surfactant which can cause water sensitivity and poor corrosion resistance.

In the practice of the invention, the protective coating composition can be applied to a metallic substrate by a conventional method such as spraying, brushing, dipping, roller coating, curtain coating or the like or by electrodeposition. A coating weight of about 0.2 to 6, preferably 0.3 to 4, more preferably about 0.5 to 3, and most preferably about 1.0 to 2.0 milligrams per square inch can be applied. It would, of course, be realized that substrates with a different surface roughness and porosity may require a different coating weight of the protective coating composition. The applied coating can be air dried or forced dried or baked in a remarkably short period of time. The resultant coating has been found to be block resistant, i.e., the coated substrates are resistant to sticking together when stacked.

Removal of the applied coating is easily effected by contacting the coated substrate with an aqueous alkaline or acidic solution. "Contacting" means such spraying, flooding, dipping (immersion) or the like can be employed. It is noteworthy that, in actual production practice, a conventional lubricating composition is not satisfactorily removed from inside an enclosed portion of a manufactured article which is not exposed to the direct impingement of a sprayed cleaner. In contrast, the coatings of this invention, including the lubricating compositions, are removed from substantially all areas including the enclosed areas by immersion thus enabling proper pretreatment of all areas of an article. Consequently, adhesion of a subsequently applied paint layer is significantly improved. It is, therefore, a distinct feature of the invention that the protective coatings of this invention can be removed effectively by immersion cleaning at ambient temperatures.

The concentration of the alkaline or acid removing solution will depend on the nature of the particular alkali or acidic solution, the temperature of removal, and the degree of neutralization by the solution. With the protective coating removed therefrom, the substrate can be used as such, or subjected to other coating processes such as conversion coating.

Since it is relatively easy to remove the protective coating composition of this invention, it is believed that the composition may be employed by itself or with a mill oil applied thereon, preferably in a relatively low amount. The combination of the protective coating and the mill oil will be removable, drawable, formable, weldable and corrosion resistant.

With the combination of the protective coating and the mill oil removed therefrom, the substrate, here again, can be used without further treatment or subjected to subsequent coating processes.

The invention is further illustrated by the following non-limiting examples.

EXAMPLE IA

This example illustrates the preparation of a water-based acrylic resin containing wax.

A reaction vessel equipped with a thermometer, stirrer, dropping funnels, reflux condenser and means for maintaining a blanket of nitrogen was charged at room temperature with a composition consisting of a mixture of 135 grams of butyl Cellosolve, 22.5 grams of butanol, and 101.3 grams of SHELLMAX (a petroleum wax having a softening point of about 60° C., available from Shell Oil Company). The composition was heated over a period of about 30 minutes to reflux. When the reflux temperature was attained, a simultaneous, gradual addition to the vessel of Charge A and Charge X was started and continued for three hours while maintaining reflux. Charge A consisted of a mixture of 317.2 grams of butyl acrylate, 202.5 grams of styrene, 135.0 grams of acrylic acid, 20.3 grams of diethyl aminoethyl methacrylate, and Charge X consisted of a mixture of 6.8 grams of butyl Cellosolve and 20.3 grams of t-butyl perbenzoate. When the addition of Charges A and X were completed at 150° C., Charge B comprising 2.3 grams of butyl cellosolve plus 2.3 grams of t-butyl perbenzoate was added and the reaction mixture was held for two hours. Charge C comprising 2.3 grams of t-butyl perbenzoate and 2.3 grams of butyl cellosolve was added at 141° C. and the reaction mixture was held for one hour. The reaction mixture was then cooled to 79° C. (A 50/50 resin/M-PYROL mixture had a Z-5 Gardner-Holdt viscosity at 41.1 percent solids.) Feed D comprising 112.5 grams of deionized water and 107.1 grams of ammonium hydroxide was added over 15 minutes and held for 15 minutes. Feed E comprising additional 1968.0 grams of deionized water was added to the reaction mixture for 1.5 hours at 72° C. Analysis: Milliequivalents of acid was 0.429, milliequivalents of base was 0.453, weight average molecular weight (Mw) was 10,924, viscosity was 4320 centipoise (Brookfield No. 4 spindle) at 20 revolutions per minute (RPM), pH was 9.30 and percent solids was 22.9 (measured at 110° C. for one hour).

EXAMPLE IB

This example further illustrates the preparation of the water-based acrylic polymer containing wax. The following were used in the preparation:

| Ingredients | Parts by Weight |
|---|---|
| Reactor Charge | |
| Butyl Cellosolve | 140.0 |
| Butanol | 23.3 |
| SHELLMAX | 483.0 |
| Charge X | |
| Butyl Cellosolve | 7.00 |
| t-Butyl perbenzoate | 9.7 |
| Charge A | |
| Acrylic acid | 322.0 |
| 1 Dodecanethiol | 4.8 |
| Charge B | |
| Butyl Cellosolve | 2.4 |
| t-butyl perbenzoate | 2.4 |
| Charge C | |
| Butyl Cellosolve | 2.4 |
| t-butyl perbenzoate | 2.4 |
| Charge D | |
| Deionized water | 117.0 |
| Ammonium hydroxide | 271.1 |
| Charge E | |
| Deionized water | 2040 |

A reaction vessel equipped with thermometer, stirrer, dropping funnels, reflux condenser and means for maintaining a blanket of nitrogen was charged at room temperature with the reactor charge. The reactor charge was heated over a period of about 30 minutes to reflux. When the reflux temperature was attained, the simultaneous, gradual addition to the vessel of Charge A and Charge X was started and continued over three hours while maintaining reflux. When the addition of Charges A and X were completed at 135° C., Charge B was added and the reaction mixture was held for two hours. Charge C was added at 125° C. and the reaction mixture was held for one hour. The reaction mixture was then cooled to 80° C. (resin solids was 82.2 percent). Feed D was added into the reaction mixture for over 15 minutes and held for 15 minutes. Feed E was added to the reaction mixture over 1.5 hours at 72° C. Analysis: Milliequivalents of acid was 0.921, milliequivalents of base was 0.805, weight average molecular weight was 1410, viscosity was 465 centipoises (Brookfield No. 4 spindle) at 20 RPM, pH was 7.10 and percent solids was 26.8 percent (measured at 110° C. for one hour).

EXAMPLE II

The water-based acrylic polymer of Example I was thinned to 12 percent solids with water and flow coated over freshly cleaned electrogalvanized panels. After air drying for 15 minutes until tack-free film was obtained, the panels were force dried for 5 minutes at 105° C. A film (coating) weight of 0.8 to 0.9 milligrams per square inch resulted.

EXAMPLE III

The water-based acrylic polymer of Example IB was thinned to 20 percent solids, applied by a No. 6 wire-wound drawbar to a freshly cleaned electrogalvanized panel, baked for 50 seconds at 550° F. to a peak metal temperature of 420° F. and quenched. A film weight of 1.1 milligrams per square inch resulted. This coated sheet was immersed in a commercial alkaline cleaner for one minute at 140° F. and rinsed for 30 seconds in hot tap water. A clean, water break-free panel resulted, indicating a high degree of cleanliness.

COMPARATIVE EXAMPLE I

As an experimental control for the panels of Example II, freshly cleaned electrogalvanized panels were coated with a commercially available mill oil which was supplied to protect galvanized and other steels from corrosion.

Quaker 61A-US oil, available from Quaker Chemical Company, was applied by putting two drops thereof on a 4×12-inch panel and rubbing the drops with the finger of a clean white cotton glove which had been soaked in the same oil. A film weight of 0.6 to 0.8 milligrams per square inch resulted. (This is higher than the approximately 0.4 milligrams per square inch of oil found on commercially available electrogalvanized steel as shipped.)

EVALUATION

HUMIDITY CORROSION TEST

Panels from Example II and the Comparative Example I were stacked together, clamped, and stored in a humidity cabinet for one week at 100 percent relative humidity and 115°±5° F.

After removal from the humidity cabinet, the test panels from Example II were cleaned by immersion in a one percent solution of an alkaline cleaner for 30 seconds at 150° F. (The alkaline cleaner, CHEMKLEEN 49, is available from Chemfil Corporation.) After rinsing with water, the panels were "water break free" indicating a high degree of cleanliness.

When these humidity-tested panels were compared visually to untested panels cleaned in the same way, there was little, if any, color change apparent in the humidity-tested panels. The lack of color change indicated very little oxidation of the zinc layer of the electrogalvanized steel.

After removal from the humidity cabinet, panels from the Comparative Example I (mill oil) were immersed for three minutes in the same one percent solution of the alkaline cleaner. After rinsing with water, there were beads of water on the panels, indicating that the panels were not clean. After solvent wiping and additional immersion cleaning for 30 seconds, the panels were water break free and judged to be clean.

When these humidity-tested panels were compared visually to untested panels (which were cleaned in the same manner), it was found that the humidity-tested panels were significantly darker than the untested panels. A gray swirling pattern indicated that there was a significant oxidation of the zinc of the galvanized steel.

EXAMPLE IV

To test the drawability (and lubricity) of the protective coating composition of Example II, additional electrogalvanized panels were coated by the same method as in Example II. Approximately 1.0 to 1.1 milligrams per square inch of coating resulted.

COMPARATIVE EXAMPLE II

As an experimental control for Example IV, a commercially available waterborne drawing lubricant, Pillsbury FB-27MC, was applied to freshly cleaned electrogalvanized panels. Eighteen drops of the FB-27MC lubricant were distributed over a 5×13-inch panel area with the finger of a clean cotton glove which was soaked in the same lubricant and allowed to dry. Approximately 0.6 milligrams per square inch of lubricant resulted.

FABRICATION TEST

To test drawability, formability (fabrication), and removability, panels from Example IV and Comparative Example II were drawn into square cups (one inch in height and 1-7/16 inches in width along each side, using a stamping dye). One area on the sides of the cups was deformed to a major strain of +20 percent and a minor strain of −12 percent. Another area on the sides of the cups was deformed to a major strain of +60 percent and a minor strain of −35 percent. The corners of the cups were deformed to a major strain of +160 percent and a minor strain of −40 percent. Panels from Example IV, temporary coating compositions were fabricated (dry) with no additional lubricant. Panels from Comparative Example II coated with a drawing lubricant were additionally smeared with an excess of fluid FB-27MC lubricant before forming into the cup shape.

After they had been drawn into cups, the panels from Example IV, temporary coating composition, showed a uniform film over the entire square cup. Only minimal galling of the zinc substrate was noted at the corners of the drawn cups. A few scratches were noted on the sides of the cups. After cleaning by immersion in a one percent solution of CHEMKLEEN 49 for one minute, at 150° F. and rinsing, a completely clean "water break free" cup resulted.

After being drawn into cups, the panels from Comparative Example II (with waterborne drawing lubricant) showed a heavily galled and polished appearance on areas of all four sides of the cups. The galling and polishing of these areas showed that the lubricant did not provide an effective fluid barrier between the stamping dye and the panels. After cleaning one cup by immersion in a one percent solution of CHEMKLEEN 49 for one minute at 150° F. and rinsing, the rinse water beaded up on the cup, indicating that the lubricant was not removed effectively.

It is concluded that in comparison to conventional drawing lubricants, the temporary coating compositions of Examples II and IV provide significantly better protection of the zinc surface of galvanized steel. Yet, the protective coating compositions exceed the removability of conventional lubricants and thus allow the proper cleaning of formed parts.

WELDABILITY TEST

To study the spot-weldability of the protective coating compositions of this invention, protective coating compositions having polymers of varying glass transition temperatures, and varying applied film thicknesses were prepared. Weldability was tested by two methods. In the first method, coated sheets were continuously spot-welded for at least 500 spot welds while observing whether the welding electrodes became coated with a current-insulating char, or whether they remained clean enough to conduct approximately 10,000 amps necessary for spot welding.

In the second method, coating penetratability, i.e., the ability of the spot welding electrodes to penetrate a coating was tested by making a small number of welds. Electrodes which had been degraded to some extent by continuous welding were used. When approximately 10,000 amps could be passed through the electrodes and the coated sheets, weldability was considered successful. When a loud cracking sound was heard, accompanied by black charring of the surrounding coating, but approximately 10,000 amps still flowed through the sheet, weldability was judged to be marginally acceptable. When the welding electrodes squeezed the panels together (in the usual manner) and no current flowed because of excessive electrical resistance, weldability was judged to be unacceptable. When some of the welds were successful with a current flow of approximately 10,000 amps, but some of the welds were unsuccessful because of excessive electrical resistance, weldability was judged to be barely weldable.

It is noted that in the welding process, after two panels of, say, steel panels are electrically connected by either a first weld, or by scratching or abrasion of one surface, or by clamping in order to provide shunting of current, welding problems associated with an organic film can be reduced. One of the problems associated with organic films would be that of a "no weld" caused by excessive electrical resistance, wherein a welder would apply a potential of about 6 volts to the electrodes without realizing a current flow. Another associated problem would be that of charring and burning around a weld area caused by the excessive electrical resistance.

For the weldability testing, a pedestal-type spot-welding machine with a maximum electrical output of 22,000 amps at 6 volts was used. The particular machine used was a Model 150AP, available from Lors Corporation of Union, N.J. The electrodes squeezed the two sheets to be welded together with a force of 525 pounds which was a conventional, recommended squeezing force for spot welding two 0.030-inch galvanized steel panels.

EXAMPLE V

In the weldability testing, there was employed the water-based polymer of Example I which was thinned to 12 percent solids with water, flow coated onto both sides of freshly cleaned electrogalvanized sheets, air dried until tack free, and forced dried for five minutes at 105° C. A film weight of 0.96 to 1.37 milligrams per square inch resulted. After making 750 spot welds on these sheets, the welding electrodes were still able to conduct approximately 10,000 amps through additional coated sheets. During the 750 spot welds, occasional charring of the coating was noted on the side of the panels with the thicker coating weight of 1.3 milligrams per square inch, but no charring was noted on the area of the panels having about 1.0 milligrams per square inch of coating. The spot weldability of this particular coating was judged to be acceptable at about 1.0 milligrams per square inch and marginally acceptable at about 1.3 milligrams per square inch.

It was surprising and unexpected that the coating of this invention flowed away from the spot-welding electrodes under continual exposure to pressure and heat and that a progressive buildup of current insulating char did not occur.

EXAMPLE VI

The worn and degraded welding electrodes from the first weldability test method in Example V were used in the second weldability test method relating to the penetratability of the coating with spot-welding electrodes, while using a conventional amount of electrode squeezing force.

The following table shows protective compositions having polymers of various glass transition temperatures which were tested for welding electrode penetration.

TABLE I

| Polymer | Tg | % Butyl Acrylate | Styrene | % Acrylic Acid | % Dimethyl aminoethyl Methacrylate | % Wax |
|---------|-------|------|----|----|---|----|
| A | −5° C. | 47 | 30 | 20 | 3 | 15 |
| B | −11° C. | 60 | 20 | 20 | — | 15 |
| C | −27° C. | 73 | 7 | 20 | — | 15 |

The electrode penetration test yielded the following weldability results at the film weight stated in Table II, hereinbelow:

TABLE II

| Polymer | Tg | Milligrams per Square Inch | Electrode Penetration Test |
|---------|--------|------|-----------------------|
| A | +5° C. | 1.0 | Acceptable |
| A | +5° C. | 1.3 | Marginally acceptable |
| B | −11° C. | 1.4 | Acceptable |
| B | −11° C. | 1.84 | Marginally acceptable |
| B | −11° C. | 2.58 | Barely weldable |
| C | −27° C. | 2.12 | Acceptable |
| C | −27° C. | 2.97 | Marginally acceptable |
| C | −27° C. | 5.5 | Barely weldable |

OTHER PROPERTIES OF THE PROTECTIVE COATING COMPOSITIONS

Additional properties desired of temporary protective coating compositions are flexibility and resistance to "blocking" or sticking together when the coated substrates are stacked.

FLEXIBILITY

To test flexibility, electrogalvanized sheets coated with the protective coating compositions of this invention were bent to a radius of 0.075 inches to what is called a "5T" bend, i.e., the coated sheet was bent over "five thicknesses" of the same sheet. The bent pieces were then immersed in a five-percent Cupric Nitrate $(Cu(NO_3)_2)$ solution for ten seconds and then rinsed. A copper-containing deposit would form on any area of exposed zinc metal. Cracks or porosity of the protective coating compositions on a bent area will be evidenced by a brown or black color after the test.

Coatings of the following composition were tested for flexiblity:

TABLE III

| Polymer | Tg° C. | % Styrene | % Butyl Acrylate | % Acrylic Acid | % Dimethyl aminoethyl Methacrylate | % Wax | 5T Bend + $CU(NO_3)_2$ Test |
|---------|----|----|----|----|---|----|----------|
| D | 35 | 50 | 30 | 20 | — | 2 | Black deposit |
| E | 5 | 30 | 47 | 20 | 3 | 15 | Light gray deposit |
| F | −12 | 17 | 60 | 20 | 3 | 15 | No effect |

BLOCK-RESISTANCE

To test the block resistance, sheets of metal coated with the protective coating compositions of this invention were pressed together in a stack with a force of 150 pounds per square inch of coated sheets at 120° F. for 16 hours and then cooled. The stack of panels was then taken apart and the individual sheets tested for any film damage caused by the heat and pressure combined with any damage caused by separating the sheets, (referred to as "uncoiling pickoff"). To test film damage, the block-tested sheets were immersed in a five-percent Cupric Nitrate solution and rinsed, to observe any brown or black copper deposition at areas of extremely low film thickness, or at areas where the film has suffered from "pickoff" by adhering to another coated sheet during the block test.

The following protective coating compositions were tested at 1.4 to 1.5 milligrams per square inch of dry film on electrogalvanized steel:

TABLE IV

| Protective Coating Composition | Tg | % Butyl Acrylate | % Styrene | % Acrylic Acid | % Wax |
|---|---|---|---|---|---|
| G | −11° C. | 60 | 20 | 20 | 15 |
| H | −27° C. | 73 | 7 | 20 | 15 |

After the block resistance test, coating composition H was found to have a dark dense copper deposition over most of the coated sheets, indicating poor film integrity after exposure to heat, pressure, and sheet separation. After the block resistance test, coating composition G showed only a very slight copper deposition over the tested area of the coated sheets, indicating that the coating was still capable of protecting the underlying metallic surface from physical abuse and corrosion. Hence, it is concluded that in addition to the properties of removability, drawability, and weldability, the protective compositions in certain embodiments can be flexible and block resistant.

ADDITIONAL EXAMPLES

EXAMPLE VII

To test weldability range of the temporary coatings of this invention relative to coating weight and Tg (°C.), there were employed welding electrodes which were worn to a significant degree from previous welding of galvanized steel coated with the coating composition of this invention, as follows. It has been believed that the use of worn electrodes is more representative of welding conditions in practice.

PART 1

The temporary coatings were prepared using the polymeric compositions in Table V below. The compositions were neutralized to about 90% theoretical neutralization with aqueous ammonia and thinned with water to about 20% solids for application to galvanized steel panels (including galvanneal) with wire wound drawbars. The coatings were prepared in essentially the same manner as described in Example II with the following exception. It has been found in previous work, that zinc surfaces can interact unfavorably with aqueous coatings and that the addition of certain salts can reduce these effects significantly. Accordingly, phosphoric acid in the form of an ammonium salt was added to each of the compositions used herein at a level of 0.79% phosphoric acid on resin solids.

Temporary coatings of these compositions were applied to 0.027 inch thick galvanneal by drawbar, baked for 40 seconds at 550° F. air temperature to a peak metal temperature of 400° F., and quenched in water. Weldability was tested using different drawbars, and thus producing different film (coating) weights.

TABLE V

| Composition | Tg (°C.) | Butyl Acrylate | Styrene | Acrylic Acid | Wax |
|---|---|---|---|---|---|
| A | −27 | 73 | 7 | 20 | 15 |
| B | −4 | 55 | 25 | 20 | 15 |
| C | 13 | 43 | 37 | 20 | 15 |

TABLE V-continued

| Composition | Tg (°C.) | Butyl Acrylate | Styrene | Acrylic Acid | Wax |
|---|---|---|---|---|---|
| D | 35 | 30 | 50 | 20 | 15 |

PART 2 (a)

A pedestal type spot welding machine with a maximum electrical output of 22,000 amps at 6 volts was used for welding tests. The machine used was a Model 150AP, available from the Lors Corporation of Union, N.J. For the determination of weldability of temporary coatings on galvanneal, worn electrodes were employed. The worn electrodes were obtained from new copper/zirconium alloy electrodes ("Z-Trodes" in the form of "A" cap with face diameter of 0.20 inches) after a total of 974 welds were made on galvanized steel sheets as follows: First, 300 welds were made on coupons comprising pairs of 3 inch by 14 inch pieces of 0.030 inch thick galvanized steel coated on both sides with 1.2 milligrams per square inch of coatings having composition B of Table V. With the welder set on its highest "tap" setting, thus determining the applied voltage at the electrodes, the percent current was adjusted between 77 and 83 percent of maximum in order to find the point at which occasional, but not continuous expulsion of molten metal occurred during the spot welding process. The electrical current passing through the coupon at the electrodes varied between 9.7 and 10.5 killiamps. After the 300 welds, an additional 674 welds were made on galvanized steel coated with the coatings having the compositions of Table V above, at coating weights ranging from 0.78 milligrams per square inch to 3.20 milligrams per square inch. The additional welds were made using a setting of 81% current which resulted in between 10.4 to 10.7 killiamps of welding current. After the additional welds were made, the electrodes had a diameter of between 5.5 and 6 millimeters, and had some pitting of their contacting surface as determined by taking carbon paper imprints of the electrodes.

PART 2(b)

The welding process was as follows: Electrodes from Part 2(a), at a force of 525 pounds were employed. A conventional timing sequence was used, in that a 50/60 seconds setting was used to "squeeze" the two sheets together with the electrodes; 8/60 seconds setting was used for the weld time when approximately 10,000 amps flowed from the weld tips through the sheets at the tips, and the force of 525 lbs remained on the tips ("hold" time) for an additional 10/60 seconds setting. The sequence was repeated after an "off" of 30/60 seconds setting.

At least six (6) coupons comprising pairs of (1×6) inch coated panels of galvanized steel were subjected to at least four (4) welds per coupon. A 30/60 seconds setting was employed in between weld sequences. To increase the wear of the electrodes, two (2) additional welds were performed on each coupon.

PART 3(a)

Method of Evaluation: To ascertain coating weldability, a coating having composition B of Table V was applied to a galvanneal substrate, using a #10 draw bar to produce a film weight of 2.5 milligrams per square inch. The coupon of the coated panels were subjected to a sequence of welds at a setting of 81 to 83 percent current to produce 10.5 killiamps of welding current.

The welds were rated by noting attendant problems such as no-welds, cracking, charring and the like. A weld was rated as "normal" in an instance when welding current flowed easily through the coated sheets without the attendant problems.

| Welding Test # | First Weld | Second Weld | Third Weld | Fourth Weld | Fifth Weld | Sixth Weld |
|---|---|---|---|---|---|---|
| #1 | Several No Welds | Normal | Normal | Normal | Normal | — |
| #2 | Several No Welds | Normal | Normal | Normal | Normal | Normal |
| #3 | Normal | Normal | Normal | Normal | Normal | Normal |
| #4 | Audible cracking sound | Normal | Normal | Normal | Normal | Normal |
| #5 | Audible cracking sound | Normal | Normal | Normal | Normal | Normal |
| #6 | Several No Welds | Normal | Normal | Normal | Normal | Normal |

PART 3(b)

To further ascertain coating weldability, a coating having composition B of Table V was applied to a galvanneal panel using a #14 draw bar to produce a film weight of 3.4 milligrams per square inch. Using (1×6) coupons of the above coated panel, the welds were made with 11 killiamps of welding current and rated as follows.

| Welding Test # | First Weld | Second Weld | Third Weld | Fourth Weld | Fifth Weld | Sixth Weld |
|---|---|---|---|---|---|---|
| #1 | Panels connected electrically* | Normal | Normal | Normal | Normal | Normal |
| #2 | Audible crack | Charred | Charred | Normal | Normal | — |
| #3 | One No Weld | Normal | Normal | Normal | Normal | Normal |
| #4 | Slight Char | Normal | Normal | Normal | Normal | Normal |
| #5 | Large (1-2 cm) Char area | Normal | Normal | Normal | Normal | Normal |
| #6 | Normal | Slight Char | Large (1-2 cm) Char area | Normal | Normal | Normal |

*bare uncoated ends of panel welded together

PART 3

The weldability relative to Tg and coating weight of the coating composition of Table V were evaluated and reported in Table VI (on galvanneal substrate) and Table VII (on galvanized substrate). The coatings were considered "normal" (i.e., "weldable"), if there were none of the aforestated problems after electrical contact has been made. The coatings were considered marginally weldable if after electrical contact has been made, most of the welds in the sequence of welds on a coupon were without the aforestated problems. Some of the welds may show charring.

TABLE VI

| Composition | Tg | Coating weight in milligrams per square inch ||
| | | Weldable | Marginally Weldable |
|---|---|---|---|
| A | −27 | 2.9 | 3.86 |
| B | −4 | 2.5 | 2.41 |
| C | 13 | 1.8 | 2.97 |
| D | 35 | 1.7 | 2.36 |

TABLE VII

| Composition | Tg | Filming weight in milligrams per square inch ||
| | | Weldable | Marginally Weldable |
|---|---|---|---|
| A | −27 | 2.31 | 3.2 |
| B | −4 | 1.57 | 2.28 |
| C | 13 | — | 1.65 |
| D | 35 | 1.35 | 1.54 |

From the foregoing, the relationship between Tg and coating weight for the claimed temporary protective coating is obtained as follows. For marginally acceptable weldability, coating weight in milligrams per square inch equals or is less than $(Tg \times -0.0253) + 3.26$. For the typically acceptable weldability, coating weight in milligrams per square inch equals or is less than $(Tg \times -0.0195) + 2.3$.

While the invention has been described and illustrated with particularity herein, it will be understood that various modifications will be apparent to one skilled in the art without departing from the scope or spirit of the invention. Accordingly, it is intended that the claims directed to the invention be construed as encompassing all aspects of the invention which would Therefore, what is claimed is:

1. A temporary protective coating on a metallic substrate, the coating being removable by aqueous cleaning solution, wherein said coating comprises:
   wax in the amount of 5 to 70 percent by weight of the resin solids content of the coating; and
   a non-wax polymer which is a neutralized acid or base functional polymerization product of an acrylic ester and an ethylenically unsaturated monomer having acid or base functionality, the polymer having a $T_g$ of about $-30°$ C. to $45°$ C.;
the weight of the coating on the substrate, in milligrams per square inch, being equal to or less than 3.26 minus 0.0253 times the glass transition temperature of the polymer in °C.

2. The coating of claim 1 wherein the neutralized acid or base functional polymer is a solution polymer.

3. The coating of claim 1 wherein the polymer is prepared by free-radical addition polymerization of ethylenically unsaturated monomers at least one of which is acid-functional.

4. The coating of claim 3 wherein the acid-functional monomer is present in an amount of about 5 to 100 percent based on total monomer composition.

5. The coating of claim 3 wherein the acid-functional polymer is base-neutralized with a volatile amine.

6. The coating of claim 1 wherein the wax constitutes no more than 30 percent by weight of the resin solids.

7. The coating of claim 3 wherein the acid-functional monomer is selected from the group consisting of acrylic acid, methacrylic acid, crotonic acid, itaconic acid, maleic acid and combinations thereof.

8. The coating of claim 1 in which the coating on the substrate, in milligrams per square inch, is equal to or less than 2.3 minus 0.0195 times the glass transition temperature of the polymer in °C.

* * * * *